Feb. 22, 1938.    W. S. HARLEY    2,109,316
OIL TANK AND BATTERY ASSEMBLY
Filed May 16, 1936    2 Sheets-Sheet 2
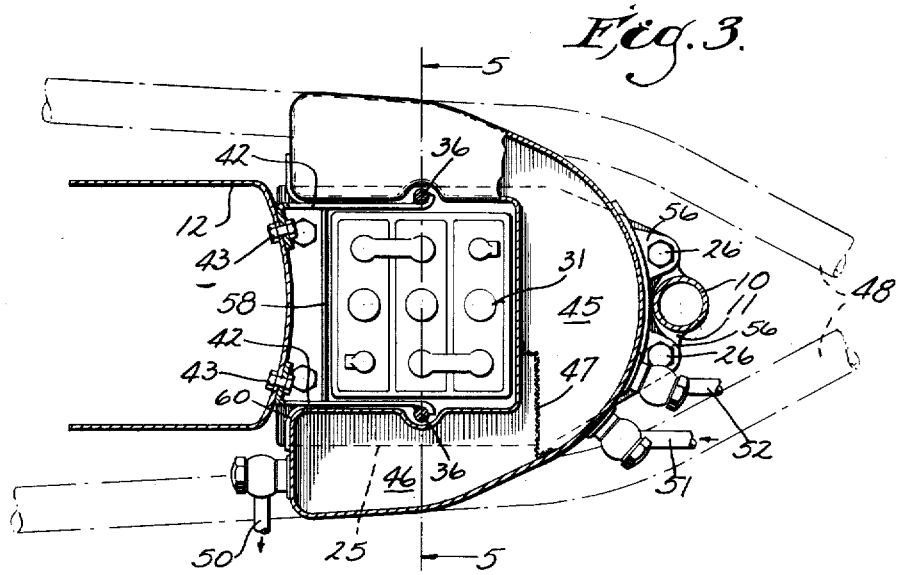
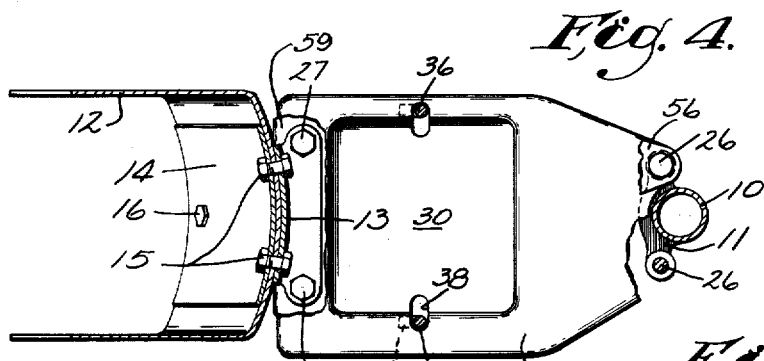
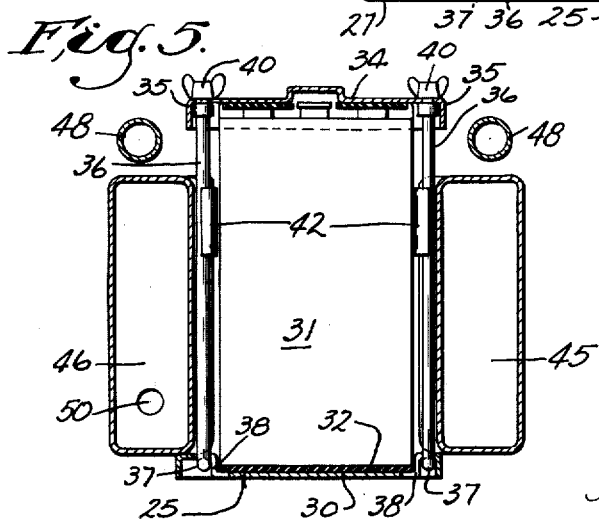
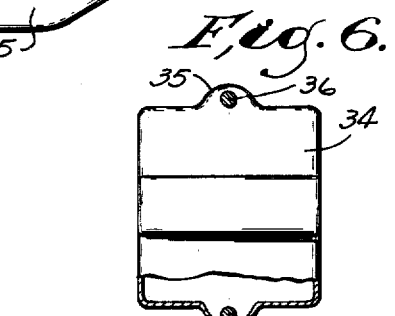
INVENTOR
William S. Harley
BY
Wheeler, Wheeler & Wheeler
ATTORNEYS Patented Feb. 22, 1938

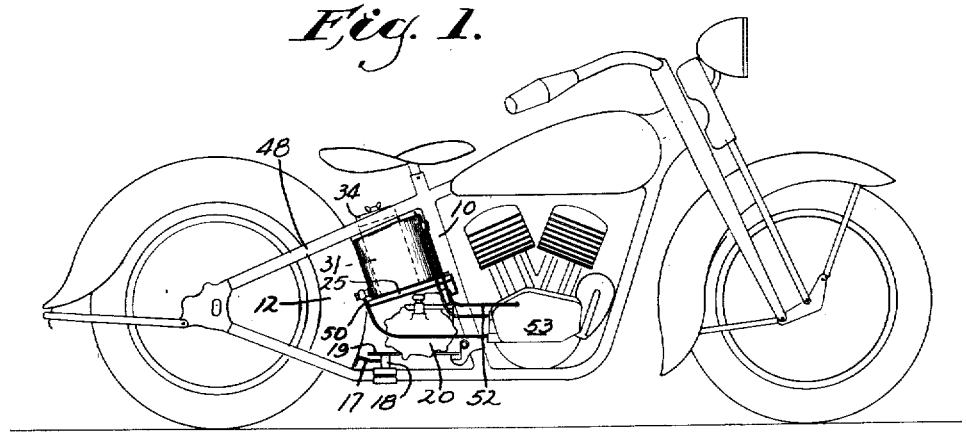
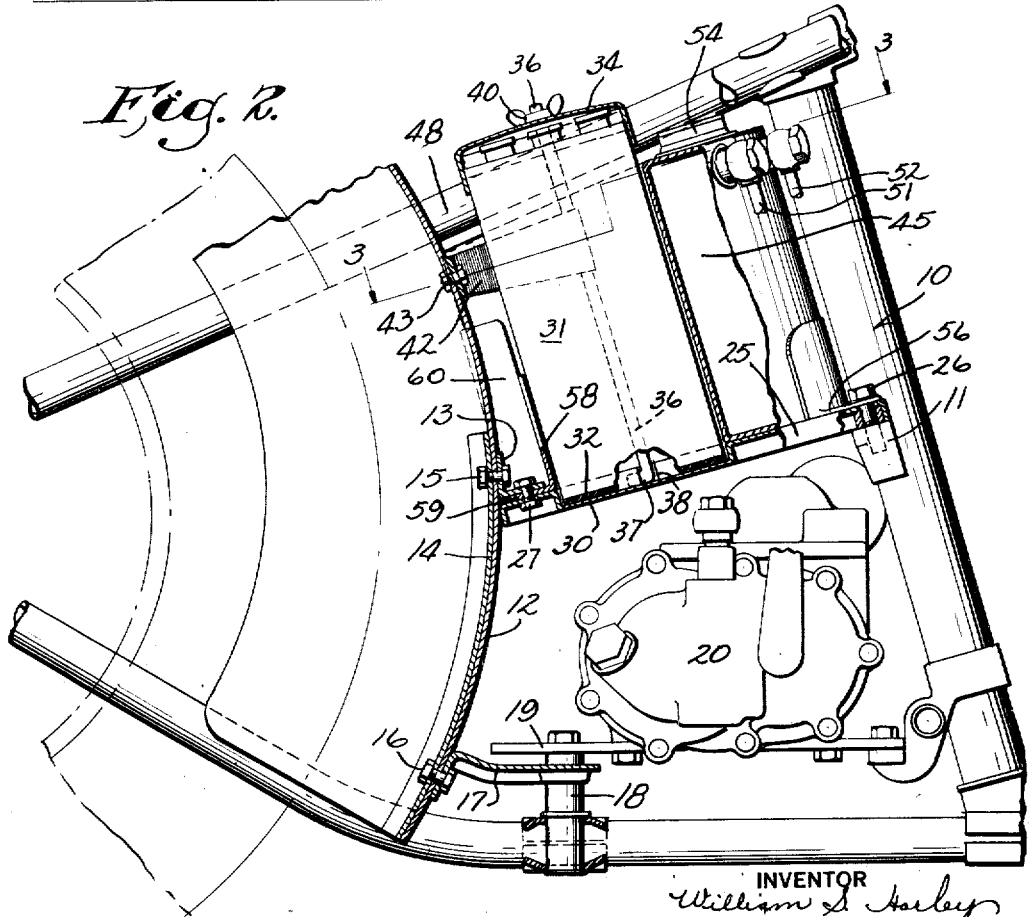

2,109,316

UNITED STATES PATENT OFFICE 2,109,316

OIL TANK AND BATTERY ASSEMBLY

William S. Harley, Milwaukee, Wis., assignor to Harley Davidson Motor Company, Milwaukee, Wis., a corporation of Wisconsin Application May 16, 1936, Serial No. 80,036

3 Claims. (Cl. 180—33)

My invention relates to improvements in combined oil tank and battery assemblies.

The objects of my invention are to provide a compact assembly peculiarly adapted for mounting in the available frame space of a modern motorcycle; to provide means whereby an oil tank may be utilized to protect the battery from damage; to provide means whereby a single shelf may be utilized to support both the battery and the oil tank; to provide means whereby both the battery and the oil tank may be mounted substantially underneath the motorcycle seat between the rear wheel and the engine; and to provide an oil tank of improved construction which will embrace the battery on three sides with subdivisions and filtering or straining means whereby the oil may be circulated to and from the bearings. Other objects will be set forth in connection with the following description of the embodiment disclosed in the drawings.

In the drawings:

Figure 1 is a side elevation of a motorcycle in which my invention has been embodied.

Figure 2 is an enlarged fragmentary view, partly in section, showing my improved assembly and associated parts of the motorcycle.

Figure 3 is a fragmentary plan view with the battery cap removed and with portions of the casing and mud guard shown in section drawn generally to line 3—3 of Fig. 2.

Figure 4 is a fragmentary plan view of the mounting table with the battery and oil tank removed.

Figure 5 is a sectional view drawn to line 5—5 of Fig. 3.

Figure 6 is a detail view of the battery cap, partly in plan and partly in horizontal section.

Like parts are designated by the same reference characters throughout the several views.

As best shown in Fig. 2, the seat post tube 10 is provided with a shelf supporting bracket 11, preferably welded thereto, and the fender 12 for the rear wheel is provided with a shelf supporting bracket 13, the associated portion of the fender being provided with a reinforcing piece 14 bolted or riveted to the fender 12 as indicated at 15 and 16. The bolt 16 is also utilized to support a bracket or brace 17 connected with the shelf supporting post 18 of an ordinary mounting shelf 19 for the transmission case 20.

The mounting shelf 25 for my improved assembly is secured to the bracket 11 by bolts 26 and to the bracket 13 by bolts 27. The battery receiving portion of the shelf is downwardly offset at 30 to receive the battery 31, with an interposed resilient cushion 32 preferably formed of rubber.

The battery is provided with a removable cap 34 having laterally projecting ears 35 (Figs. 3 and 5), suitably apertured to receive the clamping bolts 36. The lower ends of these clamping bolts have elbowed or hook-shaped extremities 37 which, in one position of adjustment, may pass through slots 38 in the shelf 25 and turn to engage underneath the shelf at the sides of the battery receiving portion 30. The upper ends of the bolts 36 are provided with clamping nuts or thumb screws 40.

Intermediately the bolts 36 are connected with the mud guard by web like brackets 42 normally bolted to the mud guard at 43. These brackets 42 are preferably welded or brazed to the clamping bolts and cooperate with them in holding the battery from vibratory contact with the wall of the oil tank. They also prevent the bolts 36 from turning and thus prevent their extremities 37 from swinging to releasing position.

The oil tank is mounted upon the front and side portions of the shelf 25 and embraces the battery on three sides. It is interiorly subdivided into two cavities 45 and 46 by a filter screen 47. The cavity 45 extends along the front and one side of the battery, the cavity 46 being largely confined to the other side of the battery as best shown in Fig. 3. The oil tank is located under the stays 48 of the motorcycle frame, whereas the battery extends upwardly between these stays. Oil is delivered from cavity 46 through the duct 50 to the bearings and returned to chamber 45 through the duct 51. Chamber 45 vents through a duct 52 to the engine crank case 53, (Fig. 1).

However, I have discovered that sufficient quantities of oil will escape from the oil tank from beneath the filler cap 54 to provide the walls of the tank with a film or coating of oil which protects the metal from the battery fumes and thus prevents corrosion of the walls of the tank and to some extent also protects the associated metal parts of the motorcycle frame, transmission case, and mud guard. On the other hand, the battery is adequately housed and protected from destructive impacts. The oil tank is provided with ear-shaped projections 56 through which the bolts 26 extend to secure the oil tank to the mounting shelf 25.

Preferably, the lower portions of the side arms of the oil tank are connected by a back wall 58 which may be molded to the oil tank in reinforcing relation to its inner rear corner portions.

This wall not only holds the sides of the oil tank from spreading, but it additionally boxes in the lower portion of the battery. It has a bottom flange 59 connected with the shelf by the bolts 27 and may also have reinforcing side flanges 60 at the respective sides of the mud guard.

I claim:

1. In a motorcycle, the combination with the saddle post tube, upper rear frame fork and mud guard, of a battery supporting shelf intermediately connecting said tube and mud guard in bracing relation thereto and in a position to support a battery with its top portion extending between and above the arms of said frame fork, said shelf having an upwardly projecting battery retaining cross wall secured to the mud guard at each end, and an oil tank extending around the battery with its ends secured to the cross wall to form a battery receiving socket.

2. The combination with the saddle post tube, upper rear frame fork and mud guard of a motorcycle, of a battery supporting shelf secured to intermediate portions of said tube and mud guard, in a position to support a battery with its top portion extending between the arms of said frame fork, said shelf being provided with a battery receiving socket, and a battery retaining cross wall having its ends secured to the respective sides of the mud guard.

3. The combination with the saddle post tube, upper rear frame fork and mud guard of a motorcycle, of a battery supporting shelf marginally secured to central portions of said tube and mud guard and provided with a socket for the lower end of a battery, said shelf having a cavitated extension of said socket adapted to serve as an oil tank embracing three sides of the battery underneath the arms of said fork, and a cross wall connecting the ends of the oil tank across the rear side of the battery receiving socket and connected with the mud guard in reinforcing relation to the guard, the shelf, and the oil tank.

WILLIAM S. HARLEY.